United States Patent [19]
Hoedl

[11] Patent Number: 5,831,823
[45] Date of Patent: Nov. 3, 1998

[54] ACCOMMODATING DEVICE FOR A PORTABLE PC

[75] Inventor: Fritz Hoedl, Vienna, Austria

[73] Assignee: Veronika Schwarzinger and Christian Uitz, Wien, Germany

[21] Appl. No.: 765,354

[22] PCT Filed: Jul. 3, 1995

[86] PCT No.: PCT/EP95/02566

§ 371 Date: Feb. 27, 1997

§ 102(e) Date: Feb. 27, 1997

[87] PCT Pub. No.: WO96/01447

PCT Pub. Date: Jan. 18, 1996

[30] Foreign Application Priority Data

Jul. 2, 1994 [DE] Germany ............... G 94 10 720.3

[51] Int. Cl.$^6$ ........................ H05K 7/20
[52] U.S. Cl. .............. 361/695; 361/686; 361/687; 361/683; 248/917; 312/208.1; 439/928.1
[58] Field of Search .................. 361/686, 687, 361/683, 695; 312/208.1, 208.4; 248/917, 918; 439/928.1

[56] References Cited

U.S. PATENT DOCUMENTS 5,552,957  9/1996  Brown et al. ............... 361/683
5,704,212  1/1998  Erler et al. ................. 361/687

*Primary Examiner*—Leo P. Picard
*Assistant Examiner*—Boris L. Chervinsky
*Attorney, Agent, or Firm*—Diller, Ramik & Wight,PC

[57] ABSTRACT

The accommodating device for a portable PC (24), particularly for a notebook and for peripheral devices such as a printer (22) and telecommunications devices, comprises a principle power supply unit (26) which can be connected to a voltage network for generating required operating voltages for the peripheral devices from the voltage network, and a separate PC power supply unit (28) which can be connected to the voltage network for generating the required operational voltages for the PC (24). Both power supply units (26,28) are arranged underneath the PC (24). Further, a cooling air flow generator (34) generates a cooling air flow to cool the principle power supply unit (26). The PC power supply unit (28) is arranged in the cooling air flow.

10 Claims, 4 Drawing Sheets

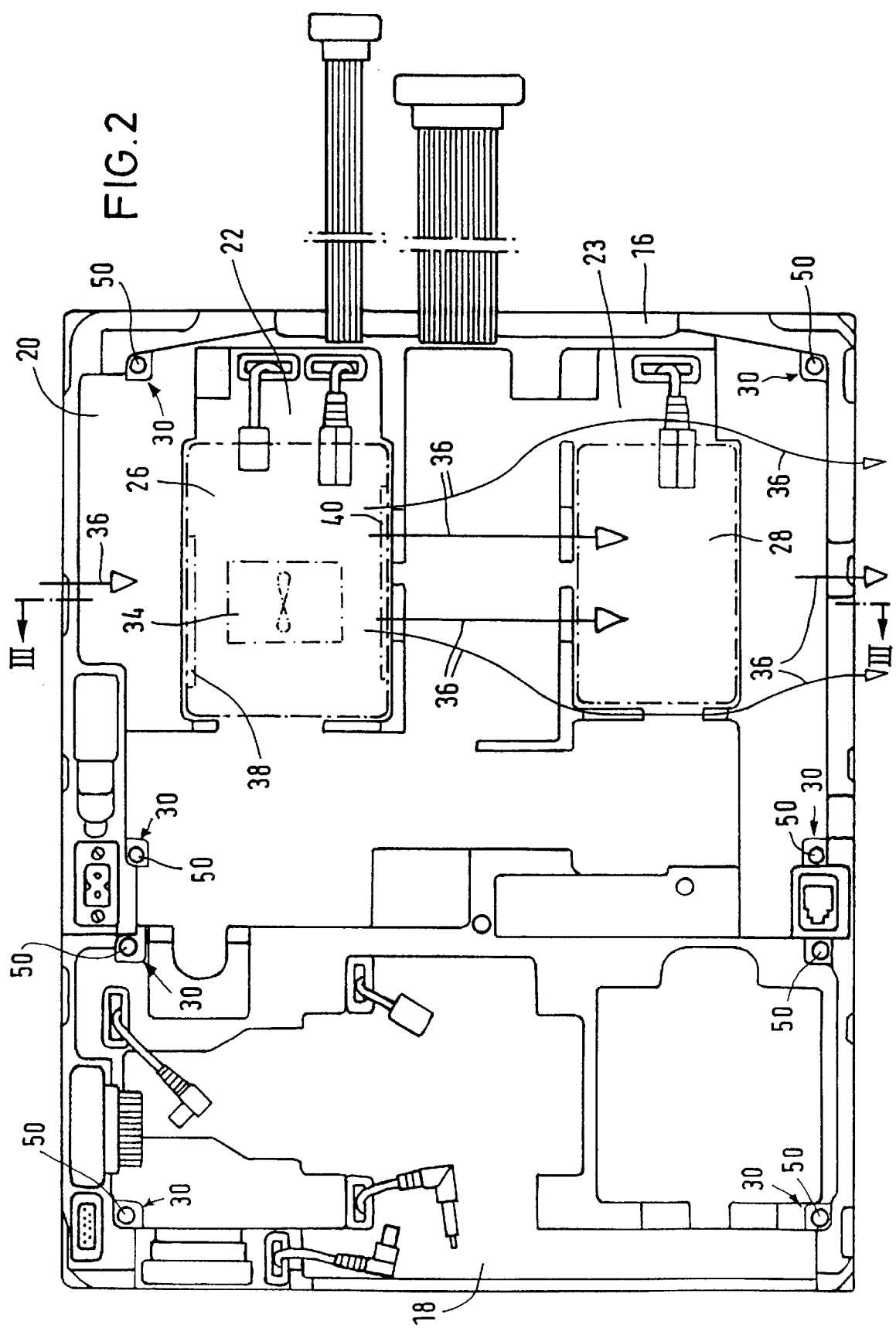

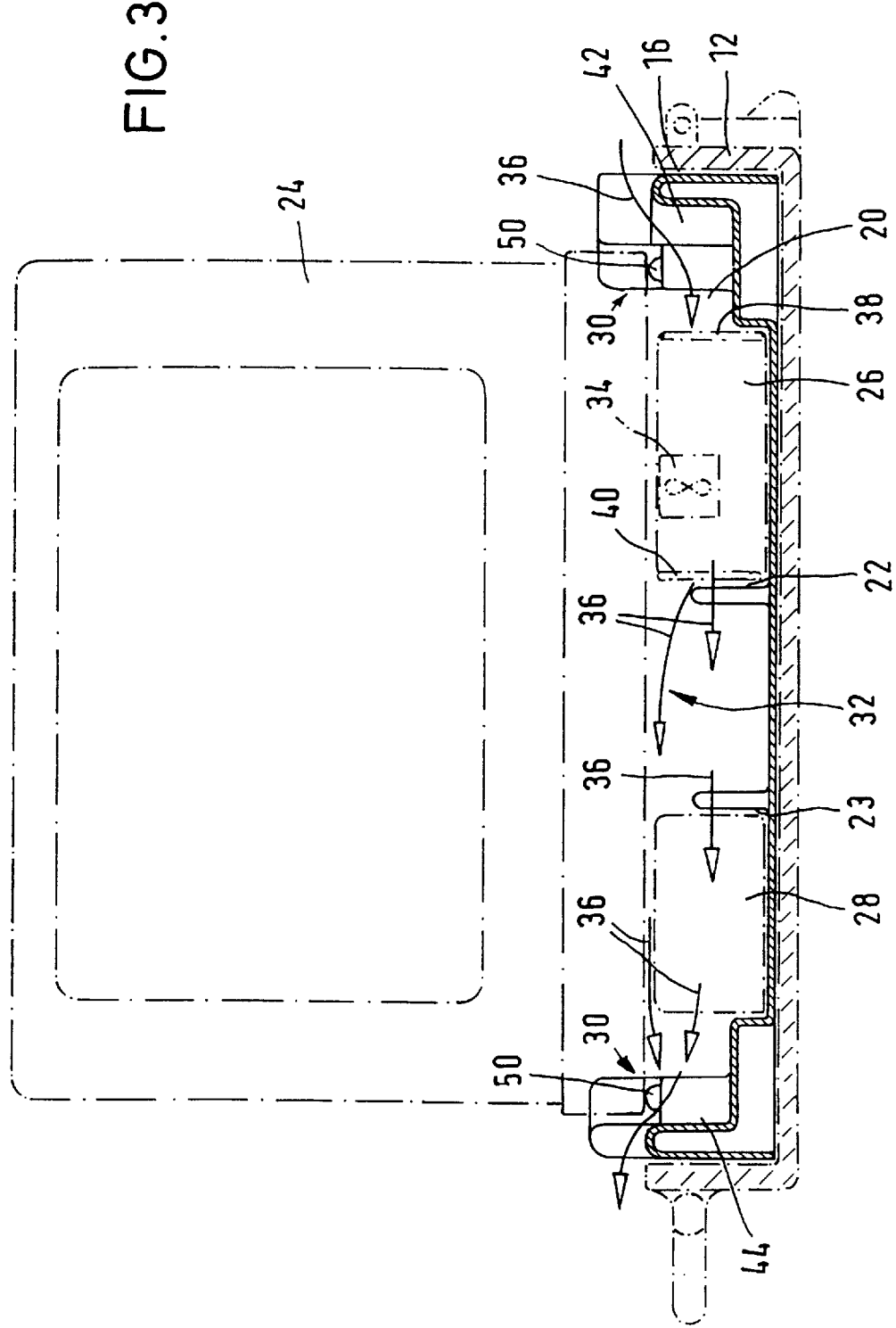

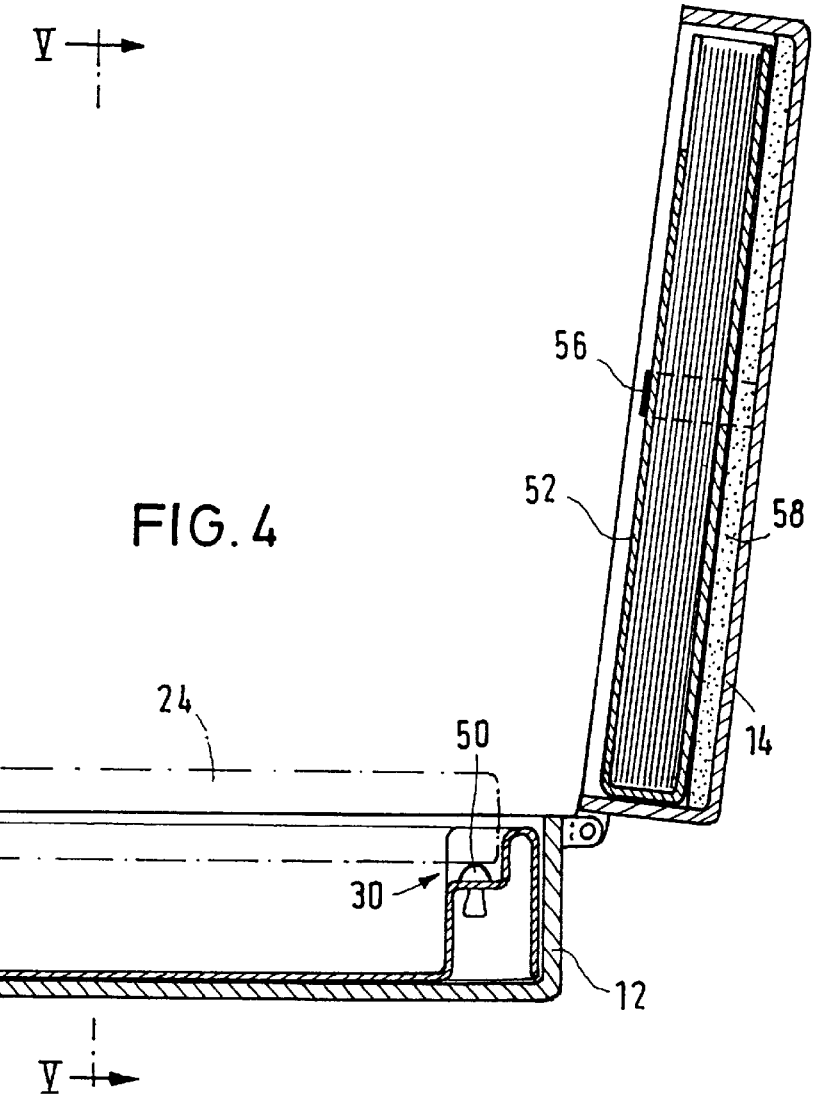
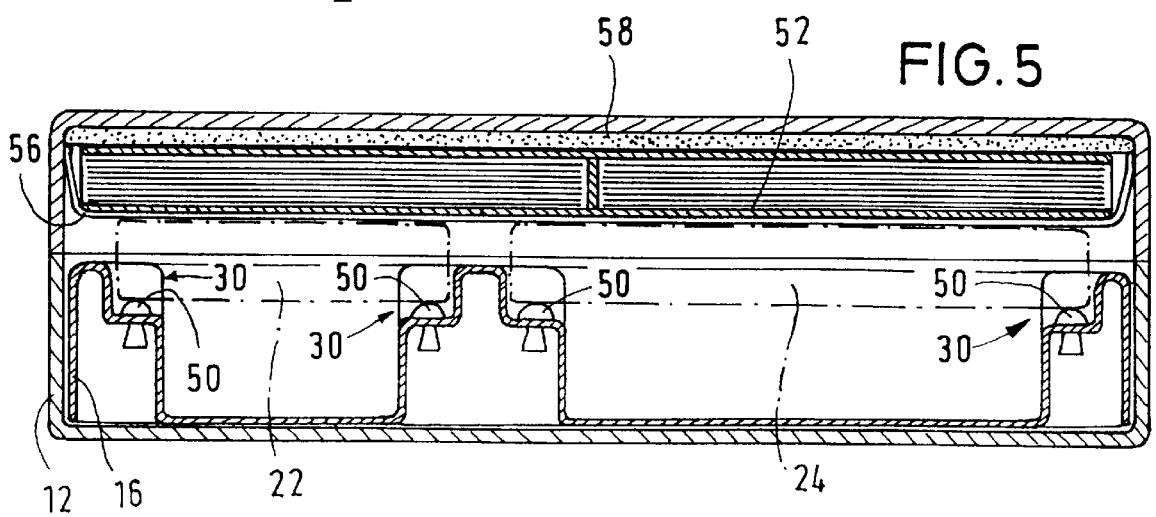

ACCOMMODATING DEVICE FOR A PORTABLE PC

BACKGROUND OF THE INVENTION

The invention relates to an accommodating device for a portable PC, particularly for a notebook and for peripheral devices such as a printer and telecommunications devices.

Accommodating devices for personal computers (PCs) are commercially available and are particularly designed as so-called notebooks. Mostly, the accommodating device is provided in the form of a suitcase, notably a hard-shelled file case of which one half-shell accommodates the portable PC and peripheral devices, particularly a printer, and telecommunications devices, such as a modem and a cellular phone and its base unit, respectively. Normally, when a PC and its peripheral devices are to be stored, a shaped body is used which is formed as a deep-drawn film which is resistant to bending and is provided with deepened portions and receptacles for the individual devices and the PC. Up to now, for energy supply to the peripheral devices and the PC, use has been made of a common power-supply unit which is arranged underneath the PC or, in other words, within the accommodating device. The power-supply unit is operative not only for energy supply but also works as a charging unit for charging the accumulators of the PC and the peripheral devices in as far as these are accumulator-operated, as is the case, e.g., with the printer. Practice has revealed that heat may often build up within the accommodating device, which is caused by the PC itself and the peripheral devices, but also by the power-supply unit.

SUMMARY OF THE INVENTION

It is an object of the invention to provide an accommodating device for a portable PC and its peripheral devices wherein, even in case of the tightest possible accommodation of the PC and its peripheral devices, problems caused by overheating are precluded.

According to the invention, for solving the above object, an accommodating device of the initially mentioned type is provided to comprise a principle power-supply unit connectible to the voltage network, for generating the required operating voltages for the peripheral devices from the network voltage, a separate PC power supply unit connectible to the voltage network, for generating the required operational voltages for the PC, both of said power supply units being arranged underneath the PC, and a cooling air flow generator for generating a cooling air flow for cooling the principle power-supply unit, the PC power supply unit being arranged particularly in the cooling air flow.

The accommodating device according to the invention comprises a principle power-supply unit for generating the operating voltages required for the peripheral devices from the network voltage, and a separate PC power supply unit for generating the operational voltages required for the PC. Both power-supply units can be connected by a cable to the voltage network; in this mode, the PC is not switched to accumulator operation but is fed by the network voltage. If the accommodating device or, more precisely, the two power supply units are not connected to the voltage network, all devices are fed by accumulators. Further, in the inventive accommodating device, the two power-supply units are arranged underneath the PC. This is provided primarily in order to save space. Further, the inventive accommodating device is provided with a cooling air flow generator. This cooling air flow generator generates a cooling air flow for cooling the principle power-supply unit. According to the invention, the PC power supply unit is arranged to be exposed to the cooling air flow. Preferably, the cooling air flow generator is provided as a blower which is suitably accommodated in the principle power-supply unit itself. In this case, the principle power-supply unit has an air-inlet means and an air-outlet means.

In the inventive accommodating device, the PC and the PC power supply unit assigned thereto are permanently supplied with fresh air by a modular air-circulating means (cooling air flow generator). This measure offers the advantage that the waste heat of the PC is permanently discharged underneath the PC as soon as the PC is not operated by use of the accumulator but is powered by its PC power supply unit. Thereby, accumulation of heat within the accommodating device is prevented. Due to the spacesaving accommodation of the components of the principle power-supply unit and the large number of the connectible peripheral devices and telecommunications devices, it is in any case advisable that the principle power-supply unit itself be cooled. In the inventive accommodating device, however, the cooling air does not only cool the principle power-supply unit but is guided also along the PC power supply unit and suitably also along the bottom side of the PC facing towards the two power supply units. In this manner, multiple use is made of the cooling air flow for cooling.

For the arrangement of the power supply units and the PC, the exact position of these units in the cooling air flow is of minor importance. Thus, it can be provided, for instance, that both power supply units are arranged upstream or downstream of the cooling air flow generator. Further, it is possible to arrange one power supply unit upstream and the other one downstream of the cooling air flow generator.

Suitably, the accommodating device is provided with a bending-resistant shaped body formed particularly from a deep-drawn film. This shaped body comprises a plurality of accommodating portions and deepened accommodating recesses for the PC and the peripheral devices as well as for the power supply units. The shaped body of the instant embodiment of the invention is further provided with an air inlet means arranged underneath the PC for air inlet into the receiving portion for the PC, and with an air outlet means arranged underneath the PC for discharging air from the receiving portion. Suitably, these air inlet and air outlet means are provided in that the receiving portion for the PC comprises an interrupted receiving face for the PC, i.e. a receiving face which is not closed continuously along its periphery, so that the air inlet means and the air outlet means remain in the form of gap-shaped openings or passages between the PC and the shaped body. Preferably, the air inlet means and the air outlet means are arranged at mutually opposite sides of the PC so that the cool air flow will extend along the bottom side of the PC over the width and respectively the length of the PC. Suitably, the shaped body can be inserted into one half-shell of a hard-shelled suitcase, particularly of a file case.

According to a further advantageous embodiment of the invention, the shaped body is provided with elastic support portions for at least the notebook and/or the printer. In this embodiment of the invention, it is not necessarily required that the PC power supply unit be arranged in the cooling air flow.

Suitably, an elastic cover is provided for abutment on the upper side at least of the notebook and/or the printer which is facing away from the shaped body. Preferably, this cover is an elastic cassette and/or an elastic damping layer.

BRIEF DESCRIPTION OF THE DRAWINGS

An embodiment of the invention will be explained in greater detail hereunder with reference to the Figures.

FIG. 2 shows a plan view of a shaped body inserted in the bottom half-shell of the case according to FIG. 1 for accommodating the notebook, the printer, the power-supply units and the other peripheral devices for the PC, as well as various telecommunication devices such as a modem etc., FIG. 3 shows a sectional view along the line III—III of FIG. 2, with the notebook and the power-supply unit schematically shown in chain-dotted lines, for illustrating the cooling air flow provided underneath the notebook, FIG. 4 shows a sectional view of the case in the opened condition, and FIG. 5 shows a sectional view in the plane V—V of FIG. 4.

DESCRIPTION OF THE PREFERRED EMBODIMENTS

Figure 1:
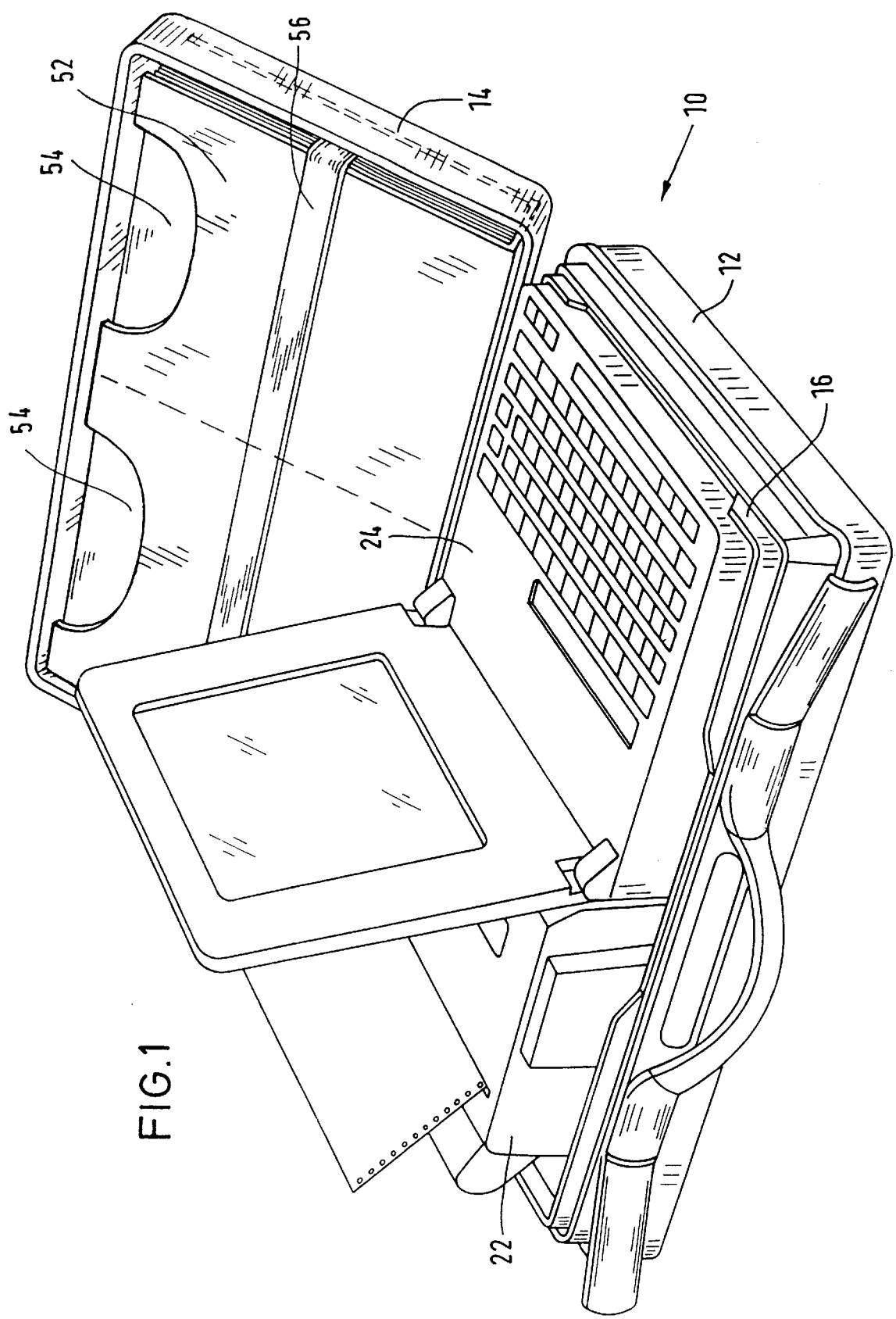
FIG. 1 shows a perspective view of a hard-shelled file case in the opened condition, with a notebook and a printer arranged in the bottom half-shell.

FIG. 1 is a perspective view of a file case 10, arranged in a lying position, comprising a bottom shell portion 12 and an opened top shell portion 14. The bottom shell portion 12 accommodates the shaped body 16 shown in plan view in FIG. 2. This shaped body 16 comprises a plurality of receptacles and deepened receiving recesses for various electronic devices. It is characteristic of the shaped body 16 that it comprises two upper receiving portions 18,20 for a printer 22 and a PC notebook 24. Formed in the shaped body 16 underneath these two receiving portions 18,20 are a plurality of deepened receiving recesses for a modem, for a 3.5" diskette drive, for cables, for a telephone data interface, for a base unit of a cordless phone and for the power supply units. Further, the shaped body 16 comprises receptacles for serial and parallel plugs, for network input plugs and for several office accessories, particularly for a stapler and for staples. For the presently file case 10 described herein, the deepened receiving recesses 22,23 for the principle power-supply unit (schematically illustrated at 26 in FIG. 2) and the PC power supply unit which is schematically illustrated at 28 in FIG. 2. Both deepened receiving recesses 22,23 are formed underneath the receiving portions 20 for the PC notebook 24. The PC notebook 24 comprises an area-wise— i.e. non continuous—receiving face arranged within receiving portion 20 and provided by the upper ends of four substantially rectangularly arranged support points formed as projections or knubs 30. As evident from FIG. 3, the projections 30 or knubs 30 have such a height that the bottom side 32 of the PC notebook 24 is arranged above the power-supply units 26,28.

As further evident from the Figures, the principle power-supply unit 26 supplying the required operating voltages to the peripheral devices, is provided with a blower 34 for generating a cooling air flow (see arrows 36). Blower 34 is arranged within principle power-supply unit 26. The principle power-supply unit 26 comprises an inlet means shown at 38 and an outlet means shown at 40. Inlet means 38 serves for suctional intake of cooling air which flows through the principle power-supply unit 26 and is discharged through outlet means 40 of principle power-supply unit 26. As illustrated in the Figures, this cooling air will further sweep along the PC power supply unit 28. However, the cooling air will also sweep along the bottom side 32 of the PC notebook so as to cool also the notebook.

As can be seen in FIGS. 2 and 3, the receiving face provided in the manner of projections 30 is not arranged continuously and does not extend over the complete bottom side 32 of PC notebook 24. Particularly, in the edge region of the PC notebook, a distance is provided between the latter and the shaped body 16. On the shaped body 16 and that edge of PC notebook 24 which is closest to air inlet means 38 of principle power-supply unit 26, a passage 42 is formed which serves for air intake. On the end of shaped body 16 opposite to this air inlet 42, another passage 44 is formed between shaped body 16 and PC notebook 24, serving for discharge of the cooling air and thus functioning as an outlet. FIG. 3 illustrates the course of the cooling air flow, wherein cooling air is sucked from the exterior of bottom shell portion 12 via inlet means 38 into the receiving portion 20 underneath PC notebook 24, flows through the principle power-supply unit 26, flows out of principle power-supply unit 26 and then will flow along PC power supply unit 28 and the bottom side 32 of PC notebook 24 and finally be discharged via outlet 44.

Finally, another essential feature of the hard-shelled suitcase 10 for a notebook 24 with peripheral and telecommunications devices (e.g. a printer 22) will be explained, notably the resilient and thus shock-absorbing accommodation of the devices in the suitcase 10.

For this purpose, the shaped body (deep-drawn film) 16 inserted in the bottom shell portion 12 of suitcase 10 has its support points 30 provided with shock absorbers in the form of spring-elastic members 50 (particularly rubber plugs) whereon the devices (notebook and printer) are supported. Said members 50 are inserted into holes of the shaped body 16 and project in upward direction (see FIGS. 4 and 5). Inserted into the top shell portion 12 of suitcase 10 is a paper storage cassette 52 with two bins 54. An elastic band 56 is provided to prevent that this cassette 52 unintentionally swings out of the top shell portion 12. Behind the cassette 52, an elastically resilient lining plate 58 (elastic damping layer) is arranged between cassette 52 and cover portion 12.

As can be seen in FIG. 5, in the closed condition of suitcase 10, the cassette 52 rests on the devices (notebook 24 and printer 22) accommodated by shaped body 16 while being subjected to a mechanical bias generated as a result of the elastic deformation (compressive strain) of the plastics cassette 52 and the elastic compression of lining plate 58. Thus, the devices are supported in a resilient and thus shock-absorbing manner on the two large-surfaced sides of suitcase 10 (the shock absorbers 50 on the lower side, and the cassette 52 and the lining plate 58 on the upper side). Protection of the devices from lateral impact forces acting on the closed suitcase 10, is obtained in that, one the one hand, the devices are arranged at distances from the lateral walls of suitcase 10 and, on the other hand, the plastic shaped body 16 has a resilient effect in the range of these distances.

Although a preferred embodiment of the invention has been specifically illustrated and described herein, it is to be understood that minor variations may be made in the apparatus without departing from the spirit and scope of the invention, as defined the appended claims.

What is claimed:

1. An accommodating device for a portable PC (24), particularly for a notebook and for peripheral devices such as a printer (22) and telecommunications devices, comprising:

a principle power supply unit (26) adapted to be connected to a voltage network for generating required operating voltages for the peripheral devices, a separate PC power supply unit (28) adapted to be connected to the voltage network for generating the required operational voltages for the PC (24), both of said power supply units (26, 28) being arranged underneath the PC (24), a cooling air flow generator (34) is provided for generating a cooling air flow for cooling the principle power supply unit (26), the PC power supply unit (28) is located in the cooling air flow, a shaped body (16) is provided for accommodating the PC (24), the peripheral devices and the two power supply units (26, 28), said shaped body (16) includes a receiving portion (20) with an interrupted, non-continuous receiving face (30) for the PC (24) having elastic support portions (50) constructed and arranged such that, between the shaped body (16) and the PC (24), at least one air inlet means (42) remains underneath the PC (24) to allow air to enter the receiving portion (20), and air outlet means (44) remains underneath the PC (24) for discharging air from the receiving portion (20), and receiving recesses (22, 23) for receiving the two power supply units (26, 28) are provided within the receiving portion (20).

2. The accommodating device according to claim 1 wherein the cooling air flow generator (34) is a blower.

3. The accommodating device according to claim 2 wherein the blower is accommodated in the principle power supply unit (26) and the principle power supply unit (26) includes an air inlet means (38) and an air outlet means (40).

4. The accommodating device according to any one of claims 1 through 3 wherein the one power supply unit (28) is arranged downstream and the other power supply unit (26) is arranged upstream of the cooling air flow generator (34).

5. The accommodating device according to any one of claims 1 through 3 wherein the cooling air flow generator (34) is arranged such that the cooling air flow streams along a bottom side (32) of the PC (24) facing towards the power supply units (26, 28).

6. The accommodating device according to any one of claims 1 through 3 wherein the PC (24), the two power supply units (26, 28), the cooling air flow generator (34) and the peripheral devices are accommodated in a case (10).

7. The accommodating device according to any one of claims 1 through 3 wherein the shaped body (16) can be inserted into a half-shell (12) of the case (10).

8. The accommodating device according to any one of claims 1 through 3 wherein the two power supply units (26, 28) are individual modules.

9. The accommodating device according to any one of claims 1 through 3 wherein an elastically resilient cover (52, 58) is provided for abutment on an upper side of at least one of the PC (24) and the printer (22) which is facing away from the shaped body (16).

10. The accommodating device according to claim 9 wherein the cover (52, 58) is one of an elastic cassette (52) and an elastic damping layer (58).

* * * * *